United States Patent
Hayashi

(10) Patent No.: US 12,065,269 B2
(45) Date of Patent: Aug. 20, 2024

(54) SPACECRAFT, COMMUNICATION METHOD, AND COMMUNICATION SYSTEM

(71) Applicant: The Foundation for Global Health Care, Aichi (JP)

(72) Inventor: Shuji Hayashi, Aichi (JP)

(73) Assignee: THE FOUNDATION FOR GLOBAL HEALTH CARE, Aichi (JP)

( * ) Notice: Subject to any disclaimer, the term of this patent is extended or adjusted under 35 U.S.C. 154(b) by 94 days.

(21) Appl. No.: 17/788,086

(22) PCT Filed: Dec. 9, 2020

(86) PCT No.: PCT/JP2020/045943
§ 371 (c)(1),
(2) Date: Jun. 22, 2022

(87) PCT Pub. No.: WO2021/131719
PCT Pub. Date: Jul. 1, 2021

(65) Prior Publication Data
US 2023/0040954 A1   Feb. 9, 2023

(30) Foreign Application Priority Data

Dec. 24, 2019   (JP) .................. 2019-233438

(51) Int. Cl.
*B64G 1/24* (2006.01)
*B64G 1/10* (2006.01)
(Continued)

(52) U.S. Cl.
CPC .......... *B64G 1/244* (2019.05); *B64G 1/1007* (2013.01); *B64G 1/34* (2013.01); *G06T 7/70* (2017.01);
(Continued)

(58) Field of Classification Search
CPC ........ B64G 1/244; B64G 1/1007; B64G 1/34; B64G 1/1021; B64G 1/1028;
(Continued)

(56) References Cited

U.S. PATENT DOCUMENTS 4,728,061 A   3/1988   Johnson et al.
6,137,171 A   10/2000   Joshi
(Continued)

FOREIGN PATENT DOCUMENTS

JP   S61268600 A   11/1986
JP   8079184 A2   3/1996
(Continued)

OTHER PUBLICATIONS

Creamer et al., "Interspacecraft Optical Communication and Navigation Using Modulating Retroreflectors", Jan. 2004, Journal of Guidance, Control, and Dynamics, 27(1):100-106 (Year: 2004).*
(Continued)

*Primary Examiner* — Valentina Xavier
(74) *Attorney, Agent, or Firm* — Millen, White, Zelano & Branigan P.C.; William F. Nixon

(57) ABSTRACT

A disclosed spacecraft is provided with: an attitude control actuator configured to control an attitude of the spacecraft; an imaging device configured to receive an optical communication signal from another spacecraft; and an attitude controller configured to control the attitude control actuator, based on a position of the optical communication signal in an image obtained by the imaging device.

8 Claims, 6 Drawing Sheets

(51) Int. Cl.
*B64G 1/34* (2006.01)
*G06T 7/70* (2017.01)
*H04B 10/118* (2013.01)
*H04N 23/661* (2023.01)
*H04N 23/667* (2023.01)
*H04N 23/90* (2023.01)

(52) U.S. Cl.
CPC ......... *H04B 10/118* (2013.01); *H04N 23/661* (2023.01); *H04N 23/667* (2023.01); *H04N 23/90* (2023.01); *G06T 2207/10032* (2013.01)

(58) Field of Classification Search
CPC .......... B64G 1/1085; B64G 1/28; B64G 1/66; B64G 3/00; G06T 7/70; G06T 2207/10032; H04B 10/118; H04N 23/661; H04N 23/667; H04N 23/90
See application file for complete search history.

(56) References Cited

U.S. PATENT DOCUMENTS

| | | | |
|---|---|---|---|
| 9,809,328 B2 * | 11/2017 | Nguyen | B64G 1/365 |
| 10,158,427 B2 * | 12/2018 | Carlson | H04B 10/118 |
| 10,277,321 B1 * | 4/2019 | Carlson | H04B 10/69 |
| 2009/0324236 A1 * | 12/2009 | Wu | H04B 10/118 |
| | | | 398/122 |
| 2016/0043800 A1 * | 2/2016 | Kingsbury | H04B 7/18513 |
| | | | 398/125 |
| 2019/0229805 A1 | 7/2019 | Velazco | |

FOREIGN PATENT DOCUMENTS

| | | |
|---|---|---|
| JP | 2001521850 A | 11/2001 |
| JP | 2001349945 A | 12/2001 |

OTHER PUBLICATIONS

Jono T., "Optical Inter-orbit Communication Experiment between OICETS and ARTEMIS", Mar. 2012, Journal of the National Institute of Information and Communications Technology, vol. 59 Nos. 1/2, pp. 1-32 (Year: 2012).*
Youngbum et al., "Design of Orbit Controls for a Multiple CubeSat Mission Using Drift Rate Modulation", Oct. 2021, Aerospace 2021, 8, 323, pp. 1-20 (Year: 2021).*
Jono Takashi,; Optical Inter-orbit Communication Experiment between OICETS and ARTEMIS; Review of the National Institute of Information and Communications technology vol. 58 No. 1/2 (2012) pp. 19-28 (w/English Abstract).
Written Opinion of The International Search Authority PCT/JP2020/045943 dated Mar. 2, 2021(pp. 1-4).
International search report PCT/JP2020/045943 dated Mar. 2, 2021 (pp. 1-3).
Notice of Reasons for Refusal in corresponding JP appl. 2019-233438 dated Apr. 1, 2020 (pp. 1-2).

* cited by examiner

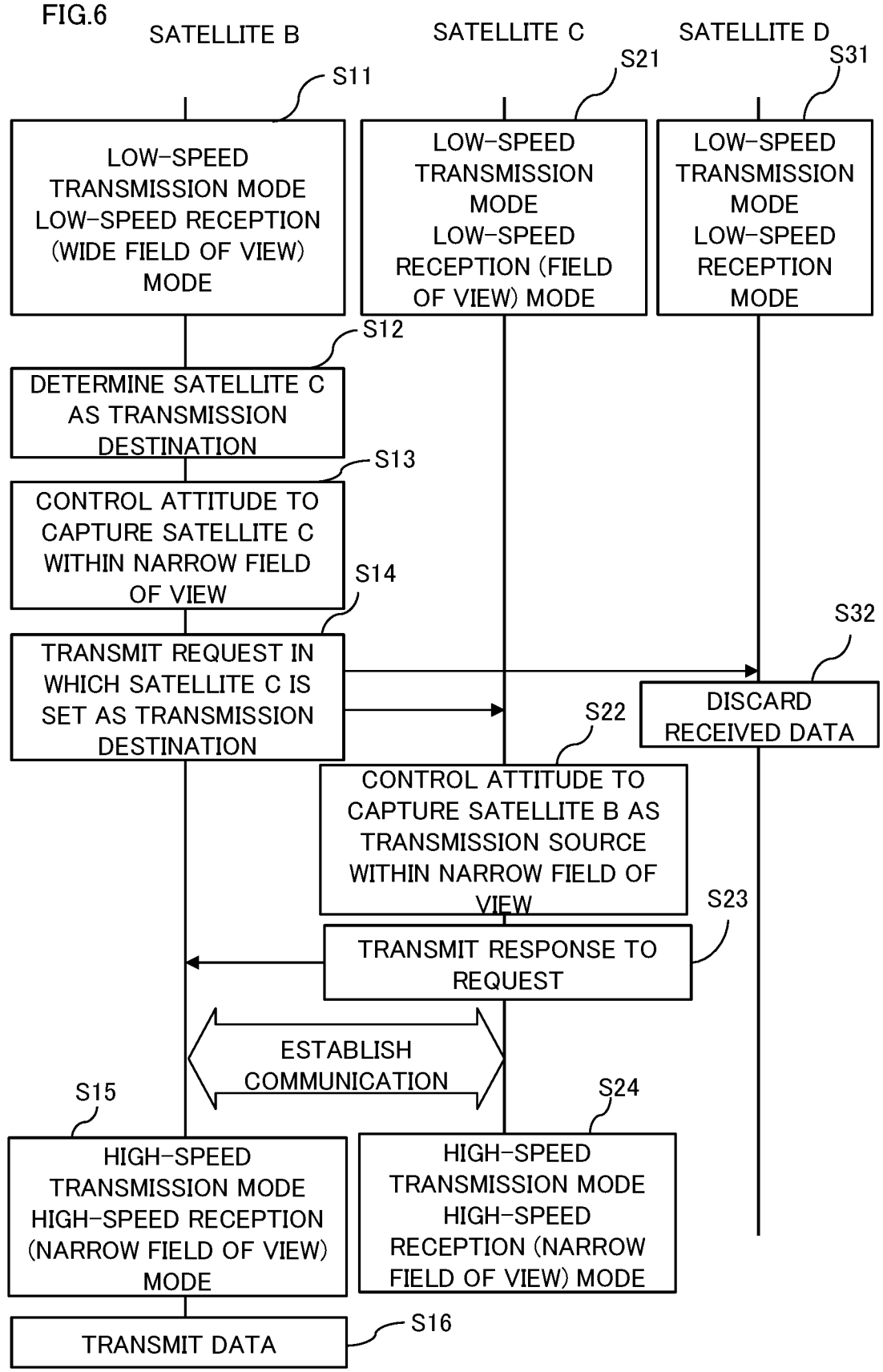

SPACECRAFT, COMMUNICATION METHOD, AND COMMUNICATION SYSTEM

TECHNICAL FIELD

The present disclosure relates to a spacecraft such as an artificial satellite, a communication method, and a communication system. This application claims priority on Japanese Patent Application No. 2019-233438 filed on Dec. 24, 2019, the entire content of which is incorporated herein by reference.

BACKGROUND ART

PATENT LITERATURE 1 discloses inter-satellite communication using laser light. An artificial satellite described in PATENT LITERATURE 1 is configured to perform a tracking operation for continuously capturing a laser beam from a communication partner according to movement of the communication partner. In PATENT LITERATURE 1, the capturing/tracking operation includes: detecting an incident direction of the laser beam by using a photodiode; and controlling a directivity control mirror.

CITATION LIST

Patent Literature

PATENT LITERATURE 1: Japanese Laid-Open Patent Publication No. H08-079184

SUMMARY OF INVENTION

In a case where an operation of, for example, capturing a communication partner is realized by controlling a directivity control mirror, a spacecraft needs to be provided with a mechanism for operating the directivity control mirror according to movement of the communication partner. This leads to an increase in size of the spacecraft.

Moreover, if the spacecraft is a relatively small satellite such as a nanosatellite, it may be very difficult to provide the satellite with a mechanism for tracking a communication partner, due to the limitation of size.

Therefore, in a spacecraft performing optical communication, it is desired to enable capturing/tracking of a moving communication partner while preventing an increase in size of the spacecraft.

In one aspect of the present disclosure, a spacecraft controls the attitude of the spacecraft, based on the position of an optical communication signal in an image that is captured to receive the optical communication signal.

In one aspect of the present disclosure, a communication method is a method for communication between ground stations. The method includes: transmitting, from a first ground station, data addressed to a second ground station so as to relay the data by inter-spacecraft communication; and relaying the data by the inter-spacecraft communication. The inter-spacecraft communication includes: transmitting the data, as an optical communication signal, from a first spacecraft to a second spacecraft: receiving, by the second spacecraft, the optical communication signal from the first spacecraft: and controlling an attitude by the second spacecraft. The second spacecraft includes: an attitude control actuator that controls an attitude of the second spacecraft: an imaging device that receives the optical communication signal from the first spacecraft; and an attitude controller that controls the attitude control actuator, based on the position of the optical communication signal in an image obtained by the imaging device. Controlling the attitude by the second spacecraft is performed by the attitude controller, based on the position of the optical communication signal in the image obtained by the imaging device.

In one aspect of the present disclosure, a communication system is a system for communication between ground stations. The communication system includes: a first ground station: a second ground station that receives data transmitted from the first ground station; and a plurality of spacecraft used for relaying, by inter-spacecraft communication, transmission of the data from the first ground station to the second ground station. The plurality of spacecraft include a first spacecraft that transmits the data as an optical communication signal, and a second spacecraft that receives the optical communication signal. The second spacecraft includes: an attitude control actuator that controls the attitude of the second spacecraft; an imaging device that receives the optical communication signal from the first spacecraft; and an attitude controller that controls the attitude control actuator, based on the position of the optical communication signal in an image obtained by the imaging device. Further details will be described later as an embodiment.

BRIEF DESCRIPTION OF DRAWINGS

FIG. 6 is a flowchart illustrating an inter-satellite communication procedure.

DESCRIPTION OF EMBODIMENTS

Figure 1:
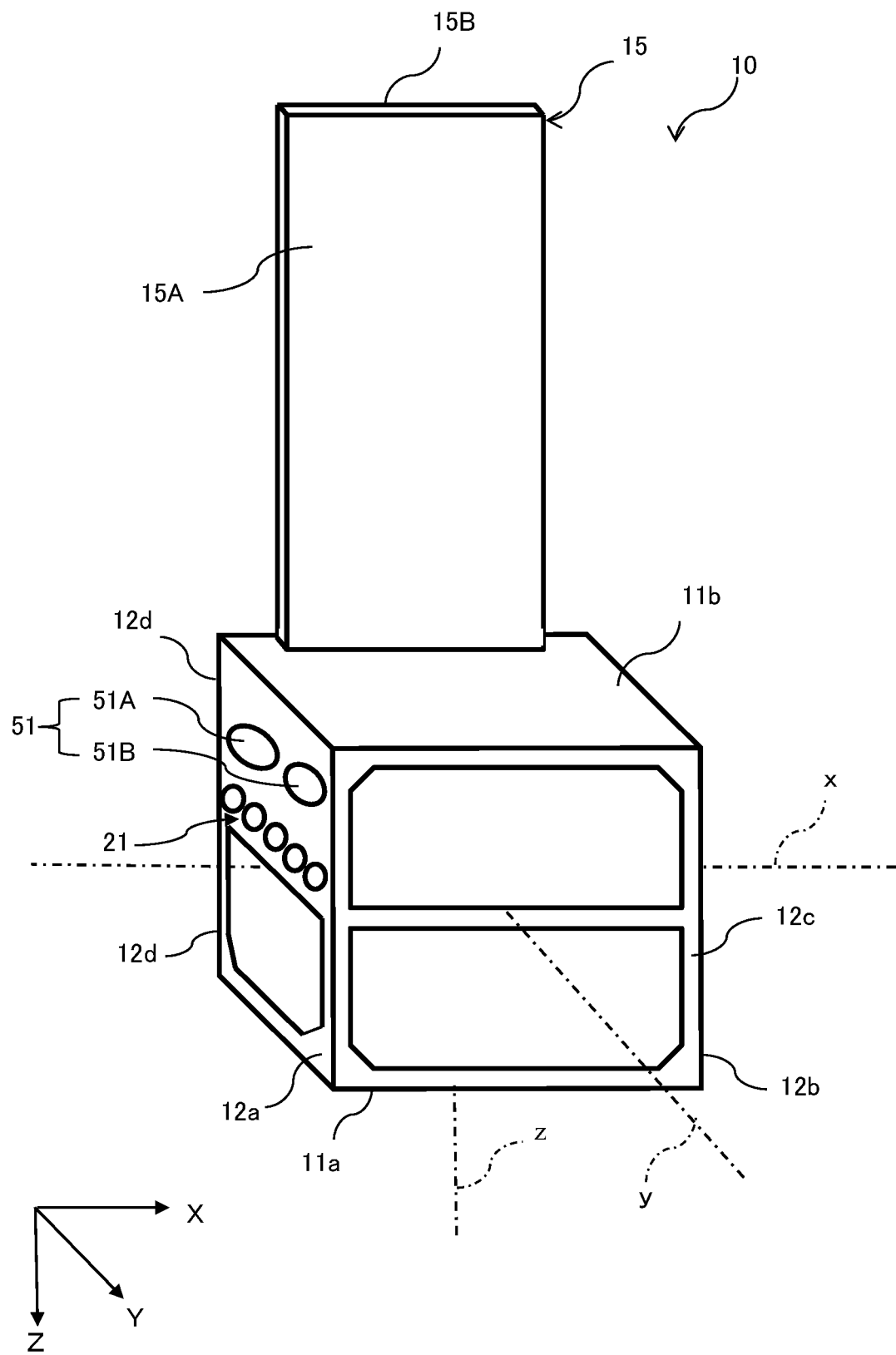
FIG. 1 is a perspective view of a nanosatellite.

1. Outline of Spacecraft (1) A spacecraft according to an embodiment is, for example, an artificial satellite or an interplanetary spacecraft. Examples of the artificial satellite include a communication satellite, a broadcast satellite, a meteorological satellite, an earth observation satellite, and a global positioning system satellite. The type of the artificial satellite is not particularly limited. The use of the artificial satellite may be, but is not limited to, commercial use and research use. As for the size of the artificial satellite, the artificial satellite may be, but is not limited to, a small satellite or a nanosatellite. It is assumed that the small satellite is a satellite having a weight not larger than 500 kg and the nanosatellite is a satellite having a weight not larger than 100 kg. The weight of the nanosatellite is preferably not larger than 50 kg, more preferably not larger than 10 kg, and further preferably not larger than 5 kg.

The nanosatellite may be a 1 U CubeSat, a 1.5 U CubeSat, a 2 U CubeSat, or a 3 U CubeSat, for example. The nanosatellite may be a 1 P PocketSat, a 1.5 P PocketSat, or a 2 P PocketSat, for example.

The spacecraft according to the embodiment includes an attitude control actuator that controls the attitude of the spacecraft. Examples of the attitude control may include de-spin control that inhibits spin of the artificial satellite, and directivity control that orients the artificial satellite in a desired direction. In order to reliably perform the de-spin control, the directivity control, or the like, the attitude control is preferably 3-axis attitude control, but may be 2-axis attitude control. The 3-axis attitude control is to control the attitude at three axes including a roll axis, a pitch axis, and a yaw axis of the artificial satellite. The 2-axis attitude control is to control any two axes out of the above three axes.

The attitude control actuator performs 3-axis or 2-axis attitude control in the spacecraft. The attitude control actuator includes a magnetic torquer, for example. The magnetic torquer is a 3-axis magnetic torquer, for example. The 3-axis attitude control may be performed by using a combination of a 2-axis magnetic torquer and a complementary 1-axis driving device, e.g., a momentum wheel. The magnetic torquer is small in size, and therefore is suitable for attitude control of a nanosatellite. The attitude control actuator may not necessarily be the magnetic torquer, and may be a thruster, for example. The thruster also can perform 3-axis attitude control. The thruster may be combined with a 3-axis momentum wheel to perform 3-axis attitude control.

The spacecraft according to the embodiment includes an imaging device that receives an optical communication signal from another spacecraft. The imaging device allows the spacecraft to receive an optical communication signal from another spacecraft. Thus, inter-spacecraft communication (e.g., inter-satellite communication) is achieved. The optical communication signal is outputted from an LED (Light Emitting Diode), for example. The optical communication signal is a visible light signal, for example.

Since light emitted from an LED has a wider angle of radiation than laser light, a transmission side spacecraft can transmit an optical communication signal to a desired transmission destination even if accuracy of attitude control of the spacecraft is low. In addition, since the imaging device that obtains an image images a relatively wide area, a reception side spacecraft can receive an optical communication signal from a desired transmission source even if accuracy of attitude control of the spacecraft is low. Therefore, when transmission of an optical communication signal by an LED is combined with reception of an optical communication signal by an imaging device, stable communication can be achieved even if accuracy of attitude control is low. The optical communication signal may be laser light, instead of LED light. A laser light source (optical transmitter) is preferably a laser light source having a wide angle of radiation, or a laser light source equipped with a diffusion mechanism for increasing the angle of radiation.

The spacecraft according to the embodiment includes an attitude controller. The attitude controller controls the attitude control actuator, based on the position of the optical communication signal in the image obtained by the imaging device. Thus, the imaging device is used not only for receiving an optical communication signal but also for obtaining an image used for attitude control of the spacecraft. The attitude controller, which controls the attitude of the spacecraft itself, can capture or track an optical communication signal. Thus, the attitude control actuator included in the spacecraft can be used as a mechanism for capturing/tracking an optical communication signal. Therefore, it is not necessary to additionally provide a mechanism for capturing/tracking an optical communication signal, or such a mechanism can be simplified, if any. Therefore, a moving communication partner can be captured or tracked while an increase in size of the spacecraft is prevented.

(2) Preferably, the spacecraft further includes a gravity attitude stabilization system for stabilizing the attitude of the spacecraft in a vertical direction with respect to a celestial body, by using gravity, from the celestial body, which acts on the spacecraft.

(3) The spacecraft has a first direction, a second direction orthogonal to the first direction, and a third direction orthogonal to the first direction and the second direction. Preferably, the first direction is orientated in the vertical direction with respect to the celestial body by the gravity attitude stabilization system. Preferably, the attitude controller is configured to control the orientations of the spacecraft in the second direction and the third direction such that the spacecraft takes an attitude that allows the optical communication signal to fall in a field of view of the imaging device.

(4) Preferably, the imaging device is configured to be able to perform imaging at a first view angle, and imaging at a second view angle smaller than the first view angle. More preferably, the spacecraft further includes a communication controller that switches the imaging device between a first mode of receiving the optical communication signal through the imaging at the first view angle, and a second mode of receiving the optical communication signal through the imaging at the second view angle.

(5) Preferably, the first mode is a mode of receiving the optical communication signal at a first communication speed, and the second mode is a mode capable of receiving the optical communication signal at a second communication speed higher than the first communication speed.

(6) Preferably, the imaging device includes a first camera having the first view angle and a second camera having the second view angle, and the second camera has a field of view that exists within a field of view of the first camera.

(7) Preferably, the imaging device includes a first imaging unit disposed on a first surface of the spacecraft, and a second imaging unit disposed on a second surface, opposite to the first surface, of the spacecraft, and each of the first imaging unit and the second imaging unit includes a first camera having the first view angle and a second camera having the second view angle.

(8) A communication method according to the embodiment is a method for communication between ground stations. The method includes: transmitting, from a first ground station, data addressed to a second ground station so as to relay the data by inter-spacecraft communication: and relaying the data by the inter-spacecraft communication. The inter-spacecraft communication includes: transmitting the data, as an optical communication signal, from a first spacecraft to a second spacecraft: receiving, by the second spacecraft, the optical communication signal from the first spacecraft; and controlling an attitude by the second spacecraft. The second spacecraft includes: an attitude control actuator that controls an attitude of the second spacecraft: an imaging device that receives the optical communication signal from the first spacecraft; and an attitude controller that controls the attitude control actuator, based on the position of the optical communication signal in an image obtained by the imaging device. Controlling the attitude by the second spacecraft is performed by the attitude controller, based on the position of the optical communication signal in the image obtained by the imaging device.

(9) A communication system according to the embodiment is a system for communication between ground stations. The communication system includes: a first ground station: a second ground station that receives data transmitted from the first ground station; and a plurality of spacecraft used for relaying, by inter-spacecraft communication, transmission of the data from the first ground station to the second ground station. The plurality of spacecraft include a first spacecraft that transmits the data as an optical communication signal, and a second spacecraft that receives the optical communication signal. The second spacecraft includes: an attitude control actuator that controls the attitude of the second spacecraft; an imaging device that receives the optical communication signal from the first spacecraft; and an attitude controller that controls the attitude control actuator, based on the position of the optical communication signal in an image obtained by the imaging device.

2. Example of Spacecraft

Figure 2:
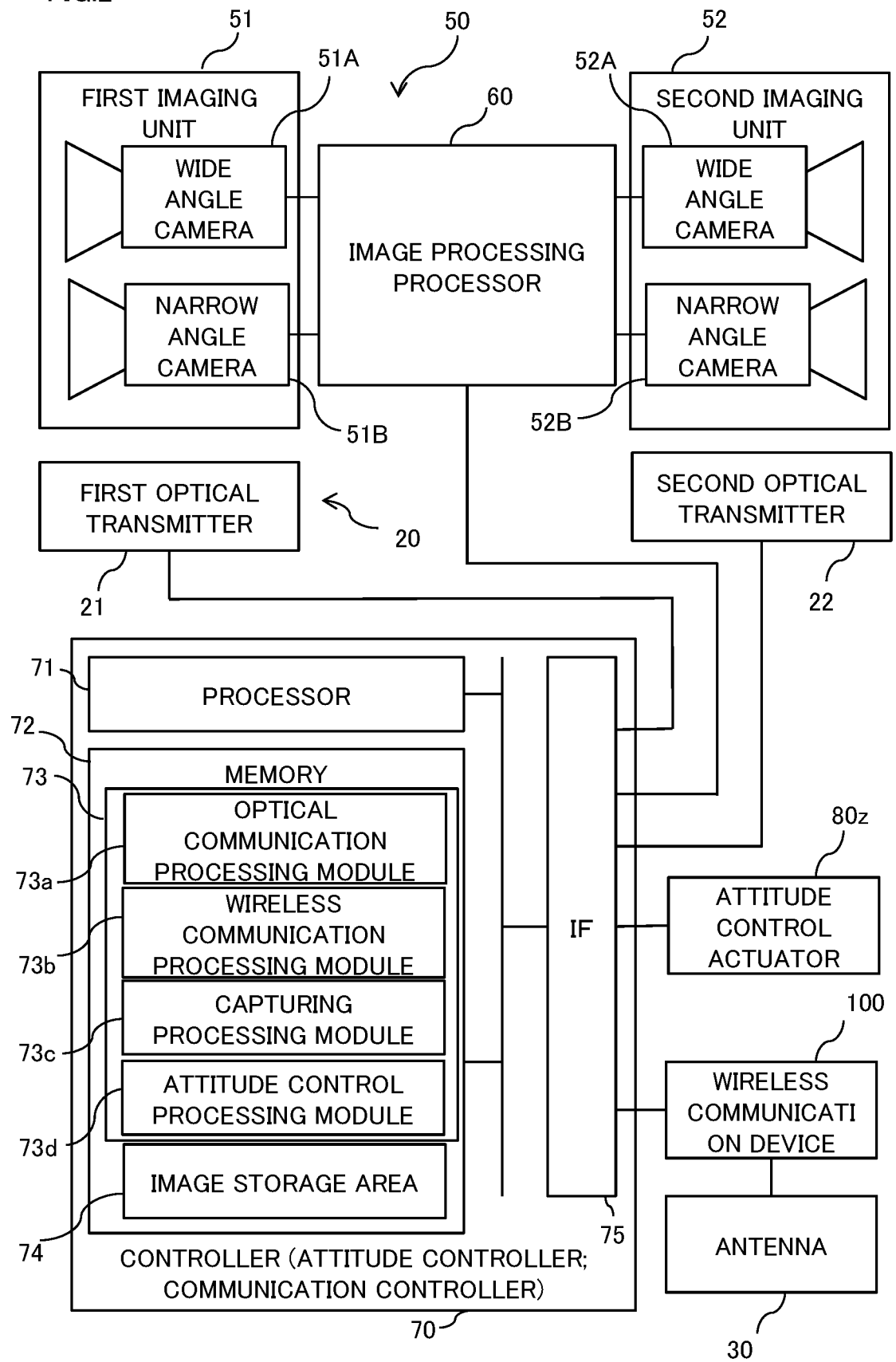
FIG. 2 is a block diagram of the nanosatellite.
Figure 3:
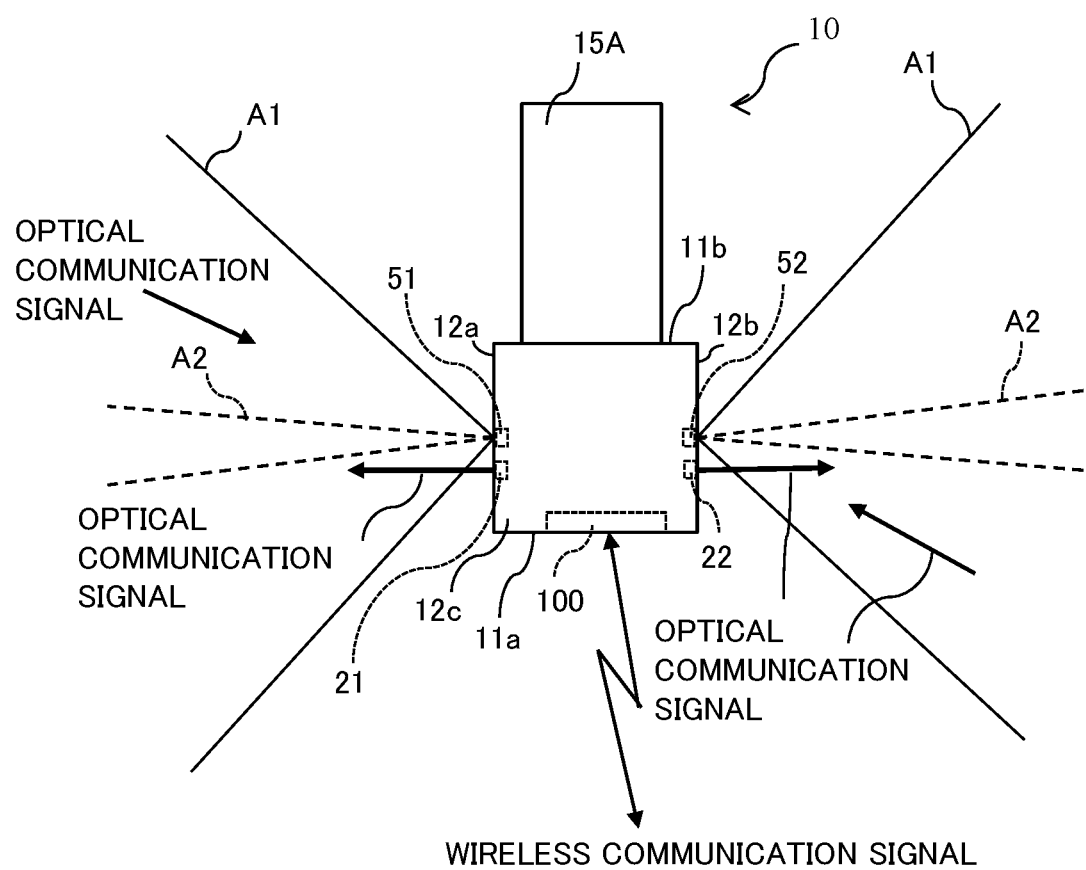
FIG. 3 is a front view of the nanosatellite.

FIG. 1, FIG. 2, and FIG. 3 show a nanosatellite 10 as an example of a spacecraft. The nanosatellite 10 according to an embodiment orbits around the earth. In FIG. 1 and FIG. 3, a direction in contact with the orbit of the satellite 10 is an X direction, a direction from the satellite 10 toward the center of the earth is a Z direction, and a direction orthogonal to the X direction and the Z direction is a Y direction. The Z direction is also referred to as an earth direction.

Furthermore, FIG. 1 shows an x axis, a y axis, and a z axis of the satellite 10. The z axis is orthogonal to an earth-oriented surface 11a of the satellite 10 and to a surface 11b opposite to the earth-oriented surface 11a. The earth-oriented surface 11a is a surface, of the satellite 10, to be oriented to the earth. In FIG. 1, a part, of the satellite 10, other than a boom 15A (described later) has a cube shape, and has six surfaces 11a, 11b, 12a, 12b, 12c, 12d including the earth-oriented surface 11a.

The earth-oriented surface 11a is provided with an antenna 30 for wireless communication with a ground station on the earth. The antenna 30 is connected to a wireless communication device 100 built in the satellite 10. The wireless communication device 100 generates a radio frequency signal, and transmits the signal from the antenna 30 to the ground station. The wireless communication device 100 can also receive a signal transmitted from the ground station. For wireless communication, a high-frequency region such as a Ku band is preferably used. In this embodiment, wireless communication refers to communication by radio waves, and does not include optical communication.

Hereinafter, the z axis is also referred to as a yaw axis, and a z-axis direction is also referred to as a yaw direction. When the z axis (earth-oriented surface 11a) faces the center of the earth, the z-axis direction coincides with the Z direction. The x axis coincides with the X direction when the z-axis direction coincides with the Z direction. The y axis coincides with the Y direction when the z-axis direction coincides with the Z direction. The x axis is also referred to as a roll axis, and an x-axis direction is also referred to as a roll direction. In addition, the y axis is also referred to as a pitch axis, and a y-axis direction is also referred to as a pitch direction.

The satellite 10 shown in FIG. 1 is a 2 U CubeSat, for example. The satellite 10 of the present embodiment does not have a propulsion unit in order to avoid an increase in weight and size thereof.

The satellite 10 can perform, in addition to communication with the ground station, inter-satellite communication (inter-spacecraft communication) with another satellite. Inter-satellite communication is performed by optical communication, preferably, visible light communication.

The satellite 10 of the present embodiment is used in a communication network. The communication network is used for a remote medical system. The remote medical system is used by a doctor to perform surgical operation, treatment, and diagnosis on a patient at a remote location. The communication network is constituted by a plurality of satellites 10 put into an earth orbit. The plurality of satellites 10 are used for relaying communication between ground stations in inter-ground-station communication. The plurality of satellites 10 can be located on an earth orbit of the same height. For example, the satellites 10 are on an orbit at a height of 500 km. A distance between the respective satellites 10 is about 100 km, for example. The plurality of satellites may be present on the same orbital plane, or may be present on different orbital planes. For the purpose of, for example, keeping the distance between the satellites 10 (communication distance) substantially constant, each satellite 10 may be equipped with a propulsion unit. The propulsion unit is preferably small in size. Such a small-sized propulsion unit is a water propulsion engine, for example. The water propulsion engine is an engine using water as a propellant. The water propulsion engine evaporates water in a vacuum space inside the engine, and discharges generated water vapor at a high speed, thereby generating a propulsive force.

In the satellite 10 of the present embodiment, a combination of a gravity attitude stabilization system (microgravity attitude stabilization system) 15 and an attitude control actuator 80 is used for stabilizing the attitude of the satellite 10. The gravity attitude stabilization system 15 structurally stabilizes the satellite 10 by a gravity gradient stabilization method. The gravity gradient stabilization method is a method for stabilizing the satellite 10 such that a longitudinal direction of the satellite 10 faces a celestial body such as the earth, by using the gravity, from the celestial body, which acts on the satellite 10.

The gravity attitude stabilization system 15 of the present embodiment includes a member that causes the satellite 10 to have a longitudinal direction. The member that causes the satellite to have a longitudinal direction is, for example, a boom 15A disposed on the surface 11b opposite to the earth-oriented surface 11a. A weight is preferably disposed at an end 15B of the boom 15A. The satellite 10 is stabilized such that the end 15B of the boom 15A faces in a direction opposite to the earth direction (Z direction). The boom 15A may be disposed on the earth-oriented surface 11a. In this case, the end 15B of the boom 15A faces in the earth direction (Z direction).

The gravity attitude stabilization system 15 allows the antenna 30 disposed on the earth-oriented surface 11a to be stably oriented to the earth. Therefore, the attitude of the satellite 10 suitable for wireless communication between the satellite and the ground station can be obtained.

The boom 15A is preferably configured to be folded before the satellite 10 is put into the orbit, and expanded after the satellite 10 has been put into the orbit.

One axis (z axis) of the satellite 10 is fixed to the earth direction (Z direction) by the gravity attitude stabilization system 15. The remaining two axes (x axis and y axis) of the satellite 10 are controlled by a control system including the attitude control actuator 80. Thus, attitude control by the attitude control actuator 80 complements the gravity attitude stabilization system 15, whereby the attitude of the satellite 10 is three-dimensionally stabilized.

Since one axis (z axis), out of the three axes of the satellite 10, is stabilized by the gravity attitude stabilization system 15, the attitude control actuator 80 only needs to have a mechanism for attitude control on two axes, e.g., a 2-axis magnetic torquer. However, if a 3-axis attitude control actuator 80 is used, rotation of the satellite 10 can be easily inhibited.

The satellite 10 has a first surface 12a and a second surface 12b orthogonal to the x axis, and a third surface 12c and a fourth surface 12d orthogonal to the y axis. In the present embodiment, of these four surfaces 12a, 12b, 12c, 12d, the first surface 12a and the second surface 12b serve as communication surfaces for optical communication with other satellites.

When some of the surfaces 12a, 12b, 12c, 12d, which are orthogonal to the longitudinal direction of the satellite 10 (the boom 15A) formed by the gravity attitude stabilization system 15, are used as communication surfaces, attitude control by the attitude control actuator 80 is facilitated. In theory, 2-axis control is enough for attitude control. That is, in the state where the earth-oriented surface 11a (z axis: first direction) is caused to face the earth by the gravity attitude stabilization system 15, the attitude control actuator 80 only needs to control the orientations of the x axis (second direction) and the y axis (third direction) of the satellite 10 such that the first surface 12a and the second surface 12b serving as the communication surfaces capture other satellites on the same orbit or other satellites on other orbits. The third surface 12c and the fourth surface 12d may serve as communication surfaces.

The satellite 10 includes an optical transmission device 20. The optical transmission device 20 transmits an optical communication signal to another satellite. The optical transmission device 20 includes one or a plurality of LEDs. As shown in FIG. 3, the optical transmission device 20 includes a first optical transmitter 21 disposed on the first surface 12a as the communication surface, and a second optical transmitter 22 disposed on the second surface 12b as the communication surface. Since the plurality of communication surfaces 12a, 12b are provided with the optical transmitters 21, 22, the optical communication signal can be transmitted to a plurality of directions.

In the present embodiment, the first optical transmitter 21 and the second optical transmitter 22 each include a plurality of LEDs. The first optical transmitter 21 and the second optical transmitter 22 are configured as LEDs equipped with reflection mirrors, for example. The first optical transmitter 21 and the second optical transmitter 22 each transmit the optical communication signal according to flashing of the plurality of LEDs. Radiation angles of the first optical transmitter 21 and the second optical transmitter 22 are set to about 10 degrees, for example.

The satellite 10 includes an imaging device 50 as an optical reception device. The imaging device 50 receives an optical signal transmitted from another satellite. The imaging device 50 includes one or a plurality of cameras. As shown in FIG. 3, the imaging device 50 includes a first imaging unit 51 disposed on the first surface 12a as the communication surface, and a second imaging unit 52 disposed on the second surface 12b as the communication surface. Since the plurality of communication surfaces 12a, 12b are provided with the imaging units 51, 52, the imaging device 50 can receive optical communication signals from a plurality of directions.

In the present embodiment, the imaging device 50 (optical reception device) and the optical transmission device 20 are disposed on each of the opposed surfaces 12a, 12b of the satellite 10. Therefore, a transmitted optical communication signal can be received by the imaging device 50 disposed on one surface (e.g., the first surface 12a), and the received optical communication signal can be relayed and transmitted by the optical transmission device 20 disposed on the other surface (e.g., second surface 12b). In this case, the optical communication signal can be relayed to a satellite existing on the side opposite to a satellite that has transmitted the optical communication signal. Therefore, telecommunication (e.g., communication to the other side of the world) via a plurality of satellites 10 can be easily performed.

In the present embodiment, as shown in FIG. 1 and FIG. 2, the first imaging unit 51 is provided with a plurality of cameras including a first camera 51A and a second camera 51B. Each camera is a video camera. The first camera 51A has a first view angle, and the second camera 51B has a second view angle smaller than the first view angle. The second camera 51B is disposed such that the field of view of the second camera 51B is within the field of view of the first camera 51A. The first view angle is about 10 degrees, for example. The second view angle is about 3 degrees, for example. Hereinafter, the first camera 51A and the second camera 51B may also be referred to as a wide angle camera and a narrow angle camera, respectively.

Preferably, the number of pixels of an image captured by the second camera 51B is less than the number of pixels of an image captured by the first camera 51A. Since the number of pixels of the image captured by the second camera 51B is small, the speed of image processing such as image readout can be increased. As a result, the speed of optical communication using the second camera 51B can be increased as compared with the speed of optical communication using the first camera 51A. In the present embodiment, the first camera 51A is used in a low-speed reception mode described later while the second camera 51B is used in a high-speed reception mode described later.

The second imaging unit 52 is provided with a plurality of cameras including a first camera 52A and a second camera 52B. The configuration of the second imaging unit 52 and how it is used are identical to those of the first imaging unit 51.

The image captured by each of the cameras 51A, 51B, 52A, 52B is provided to an image processing processor 60. The image processing processor 60 subjects the image to processing required for optical communication and attitude control. The image processing performed by the image processing processor 60 includes detecting an optical communication signal in the image.

The satellite 10 is provided with a controller 70. The image and the optical communication signal obtained by the image processing processor 60 are provided to the controller 70. The controller 70 of the present embodiment operates as an attitude controller that performs attitude control based on the position of the optical communication signal in the image and as a communication controller that controls optical communication and wireless communication.

The controller 70 is implemented by a computer including a processor 71 and a memory 72. The processor 71 executes a computer program 73 stored in the memory 72. The program 73 includes a variety of processing modules such as an optical communication processing module 73a, a wireless communication processing module 73b, a capturing processing module 73c, and an attitude control processing module 73d. The memory 72 includes an area 74 where the images captured by the imaging device 50 are stored.

The optical communication processing module 73a includes a command that causes the processor 71 to execute an optical communication process using the optical transmission device 20 and the imaging device 50. The wireless communication processing module 73b includes a command that causes the processor 71 to execute a wireless communication process using the wireless communication device 100.

Optical communication in the satellite 10 includes transmission in a plurality of transmission modes having different communication speeds, and reception in a plurality of reception modes having different communication speeds. Switching of each mode is executed by the optical communication processing module 73a. The plurality of transmission modes include, for example, a low-speed transmission mode (first mode) and a high-speed transmission mode (second mode). The speed of optical transmission is changed according to change in the flashing speed of light in the optical transmission device 20. The plurality of reception modes include, for example, a low-speed reception mode (first mode) and a high-speed reception mode (second mode). In the present embodiment, the low-speed reception mode is a mode of receiving optical communication signals by the first cameras 51A, 52A which are wide angle cameras, and the high-speed reception mode is a mode of receiving optical communication signals by the second cameras 51B, 52B which are narrow angle cameras.

The capturing processing module 73c includes a command that causes the processor 71 to execute a process of capturing another satellite that transmits an optical communication signal, based on the position of the optical communication signal in the image. Capturing of another satellite is performed by the first cameras 51A, 52A which are wide angle cameras. The first cameras 51A, 52A each have a wide field of view, and therefore are suitable for capturing another satellite 10.

The attitude control processing module 73d includes a command that causes the processor 71 to execute a process of controlling the attitude control actuator 80 so as to adjust the attitude of the satellite 10 itself such that another satellite captured as a communication partner is kept in the state of being captured within the field of view of (within the image captured by) the camera 51A, 51B, 52A, or 52B. In the present embodiment, the controller 70 controls the attitude of the satellite 10 such that the other satellite falls within the field of view of the second camera 51B or 52B which is a narrow angle camera.

Since the other satellite captured as a communication partner is kept in the state of being captured within the field of view of (within the image captured by) the camera 51A, 51B, 52A, or 52B, an optical communication signal from the other satellite can be received by any of the cameras 51A, 51B, 52A, 52B.

Figure 4:
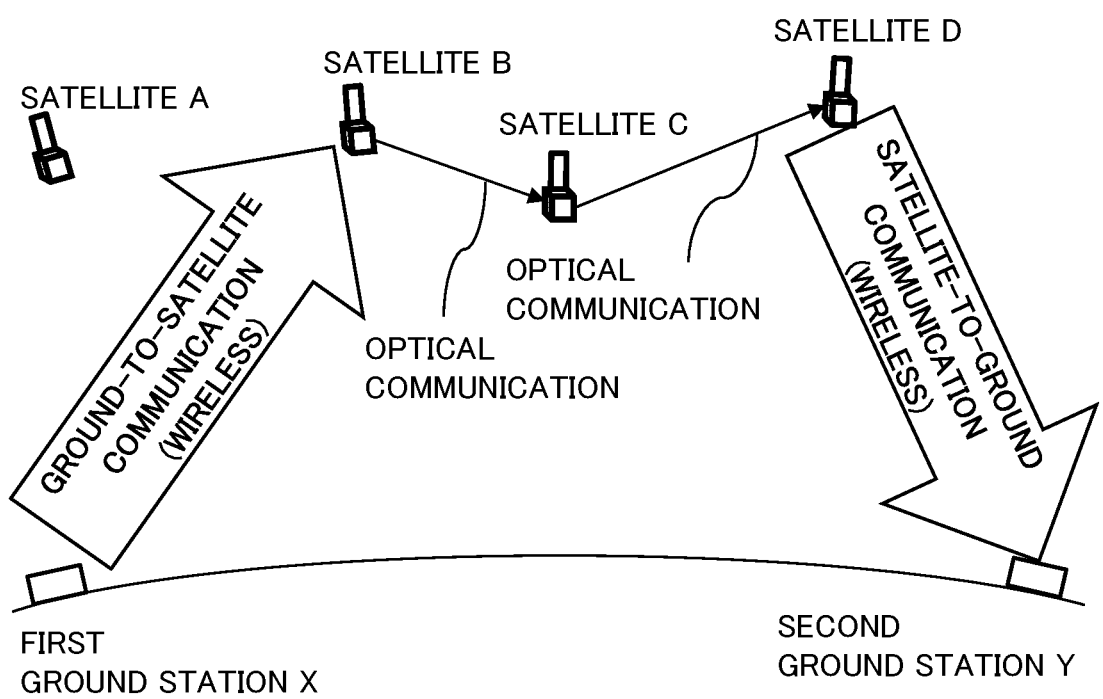
FIG. 4 illustrates communication between ground stations using inter-satellite communication.

FIG. 4 shows an example of inter-ground-station communication using inter-satellite communication performed by a plurality of satellites A, B, C, D. Each of the satellites A, B, C, D shown in FIG. 4 is the satellite 10 according to the present embodiment. A first ground station X and a second ground station Y are installed on the earth. For example, the first ground station X is connected to a remote surgery operation apparatus used by a doctor who conducts an operation, and the second ground station Y is connected to a surgery robot that performs the operation on a patient. Hereinafter, an example of transmitting data from the first ground station X to the second ground station Y will be described.

First, the first ground station X selects the satellite B as a transmission destination, based on the positions or the like of the plurality of satellites A, B, C, D, and transmits data to the satellite B through a wireless communication signal. To the data, the address of the second ground station Y which is the final destination of the data is added as a destination address. It is assumed that all the satellites A, B, C, D are in the low-speed transmission mode and the low-speed reception mode which are initial modes (first modes) (see steps S11, S21, and S31 in FIG. 6). In the initial state, the optical transmission devices 20 of the satellites A, B, C, D output, as optical communication signals in the low-speed transmission mode, light flashing patterns indicating unique IDs of the satellites A, B, C, D.

Upon receiving the wireless communication signal, the controller 70 of the satellite B acquires the data from the wireless communication signal by the wireless communication processing module 73b. The wireless communication processing module 73b sends the data to the optical communication processing module 73a. The optical communication processing module 73a determines a satellite to be a transmission destination (communication partner) of the data (step S12 in FIG. 6), and transmits the data as an optical communication signal to the satellite (step S16 in FIG. 6).

It is assumed that, in the satellite B, (the optical communication signal of) the satellite A is imaged by the first camera 51A of the first imaging unit 51, and the satellites C, D are imaged by the first camera 52A of the second imaging unit. The controller 70 of the satellite B selects the imaging units 51, 52 to be used for capturing a satellite to be a communication partner, based on the position, on the earth, of the second ground station Y which is the destination of the data. Since, out of the first imaging unit 51 and the second imaging unit 52, the second imaging unit 52 faces the second ground station Y side, the second imaging unit 52 is selected.

In the case where coordinates of the second ground station Y are added to the data, the controller 70 can grasp the position of the second ground station Y by referring to the coordinates added to the data. Moreover, the controller 70 may have a table in which the address of the second ground station Y is associated with the coordinates thereof on the earth, and may grasp the coordinates of the second ground station Y from the destination address added to the data.

Figure 5:
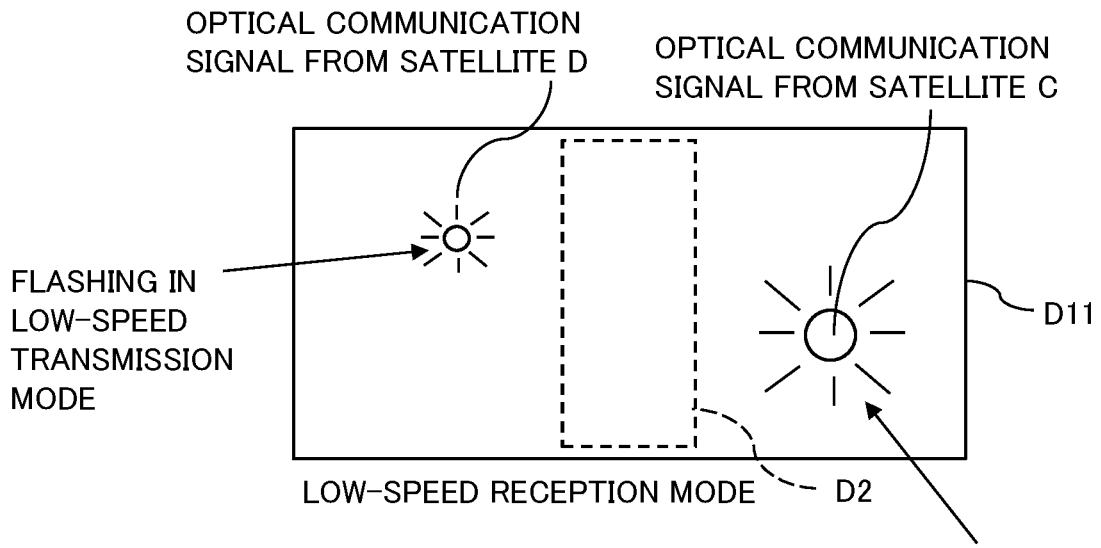
FIG. 5 shows an image illustrating capturing of a satellite.
Figure 5:
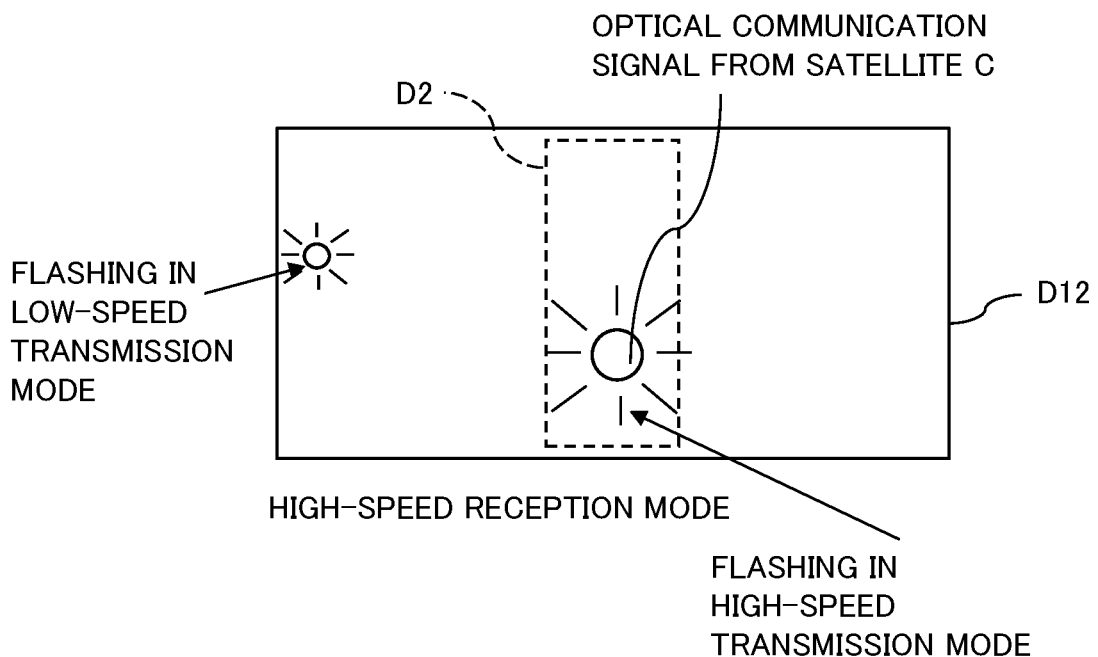

FIG. 5 shows images D11, D12 obtained by the first camera 52A of the second imaging unit. The image D11 is an image before another satellite to be a communication partner is captured. An optical communication signal (flashing light) from the satellite C and an optical communication signal (flashing light) from the satellite D appear in the image D11. The controller 70 of the satellite B grasps that the transmission sources of the optical communication signals are the satellite C and the satellite D, respectively, based on the light flashing patters of the optical communication signals in the image D11.

The method for determining a satellite to be a communication partner is not particularly limited. For example, a satellite closest to the satellite B may be determined as a communication partner. For example, the satellite C is closer to the satellite B than the satellite D as shown in FIG. 4, and therefore, in the image D1, the light intensity of the optical communication signal from the satellite C is higher than the light intensity of the optical communication signal from the satellite D. Therefore, the controller 70 of the satellite B determines, as a communication partner, the satellite C having the highest light intensity in the image D11 (step S12 in FIG. 6).

Subsequently, the controller 70 of the satellite B causes the attitude control actuator 80 to adjust the attitude of the satellite B such that (the optical communication signal of) the satellite C falls within a field of view D2 of the second camera 52B of the second imaging unit 52 (step S13 in FIG. 6). The image D12 shown in FIG. 5 indicates the state where (the optical communication signal of) the satellite C is within the field of view D2.

When the satellite C is captured within the field of view D2 of the second camera 52B, the controller 70 of the satellite B transmits a communication establishment request as an optical communication signal (a signal in the low-speed transmission mode) to the satellite C (step S14). On the communication establishment request, the address (unique ID) of the satellite C is set as a transmission destination address and the address (unique ID) of the satellite B is set as a transmission source address.

The satellite C receives the optical communication signal as the communication establishment request by the first camera 51A which is a wide angle camera (reception in the low-speed reception mode). Although the request may also be received by the satellite D, the satellite D discards the request because the transmission destination of the request is not the satellite D (step S32).

The controller of the satellite C controls the attitude of the satellite C such that the satellite B, which is the transmission source of the received request, is captured within the field of view of the second camera 51B which is a narrow angle camera (step S22).

When the satellite C enters the field of view of the second camera 52B, the controller 70 of the satellite B transmits, to the satellite C, a response to the request (step S23). Through the above procedure, communication is established between the satellites B and C. When the communication has been established, the controllers (communication controllers) 70 of the satellites B, C are switched to the high-speed transmission mode and the high-speed reception mode, respectively, which are the second modes (step S15, step S24).

The satellite B in the high-speed transmission mode transmits the data received from the first ground station X, as an optical communication signal to the satellite C. The satellite C in the high-speed reception mode receives the optical communication signal by the second camera 52B. Although the relative positions of the satellite B and the satellite C may be changed while traveling on the orbit, the communication established state therebetween can be maintained because the attitudes of the satellites B, C are controlled so as to be kept in the state of being captured within the fields of view of the second cameras 51B and 52B, respectively. If the satellites as the communication partners become outside of the fields of view of the second cameras 51B, 52B, the controller 70 performs switching to signal reception and attitude control by the first cameras 51A, 52A, and captures the communication partners again.

Upon receiving the data through the optical communication signal, the satellite C transmits the data to the satellite D through an optical communication signal in the same procedure as that for the satellite B. The satellite D detects that it is present above an area around the second ground station Y which is the destination of the data, and transmits the data to the second ground station Y through a wireless communication signal. Thus, the data is transmitted from the first ground station X to the second ground station Y by using inter-satellite communication. When the communication has ended, each satellite returns to its initial mode (first mode).

3. Additional Note

<3.1 Additional Note 1>

The present invention is not limited to the above embodiment, and various modifications can be made. For example, each of the first imaging unit 51 and the second imaging unit 52 may be composed of a single camera. In this case, preferably, the view angle (field of view) of the camera is changeable. The large view angle facilitates capturing of another satellite. The small view angle is suitable for reception of an optical communication signal from another satellite having been captured. The large view angle facilitates capturing of not only another satellite existing on the same orbital plane but also another satellite existing on another orbital plane. When an optical communication signal is transmitted to another satellite existing on another orbital plane, the angle of radiation of the optical communication signal to be transmitted is preferably large.

In switching between a plurality of reception modes, an image area to be read out for optical communication may be changed without changing the view angle of the camera. For example, in the low-speed reception mode, an optical communication signal may be detected from an entire image obtained by the camera, whereas, in the high-speed reception mode, an optical communication signal may be detected from an image area near the optical communication signal having been captured. After another satellite has been captured, an optical communication signal can be detected by only reading out pixels in the image area near the optical communication signal without the necessity of reading out pixels in the entire image. By reducing the image area where an optical communication signal is detected, an image readout time and an image processing time required for detecting the optical communication signal can be reduced, whereby a higher speed signal can be received.

Each camera used in the imaging device 50 may be a color camera or a monochromatic camera. Since the monochromatic camera need not detect colors, the sensitivity thereof can be made 3 times or more as high as that of the color camera.

In the above example, the satellite C closest to the satellite B is selected as a communication partner. However, of satellites whose light intensities are equal to or higher than a predetermined value (a light intensity sufficient for high-speed optical communication), a satellite having the lowest light intensity may be selected as a communication partner. In this case, for example, the satellite D may be selected as a communication partner for the satellite B.

In order to avoid a situation that another light source (e.g., a bright star) overlaps a satellite as a communication partner (e.g., the satellite C with respect to the satellite B) and interferes with communication, pseudo random signals may be superposed on data transmitted from the respective satellites, and only signals having the same pseudo random pattern may be detected. As an alternative countermeasure against overlapping of another light source, a method (using a subcarrier) in which light is flashed at a high rate (e.g., 100 kHz) and data is superposed on the flashing light at a low rate (e.g., 10 kHz), may be used. If light incident from the background of a satellite is much stronger than light emitted from the satellite, sensitivity at the reception side is considerably degraded. Therefore, preferably, an operation of interrupting communication or switching to communication with another satellite is performed.

For recognition of another satellite and selection of a satellite to be a communication partner, an outer shape of the satellite may be used. For example, if individual satellites have characteristic shapes serving as unique identifiers of the satellites, the controller 70 of each satellite may identify another satellite by recognizing the characteristic shape in an image.

For selection of a satellite to be a communication partner, the size of the satellite recognized in an image may be used. The size of the satellite to be recognized changes according to a distance between satellites. Therefore, if a satellite to be a communication partner is desired to be selected based on a distance between satellites, the satellite to be a communication partner can be selected based on the size of the satellite recognized in an image. For example, if another satellite that is closest is desired to be selected as a communication partner, a satellite recognized to be largest in size may be selected as a communication partner.

The imaging device 50 that receives an optical signal from a communication partner may be provided with a filter that cuts light having wavelengths other than the wavelength of the optical signal. In this case, the light other than the optical signal is inhibited from causing noise.

An optical signal for communication is not limited to visible light, and may be light on the longer wavelength side than visible light. Moreover, an optical signal for communication may include transmission data superposed on each of a plurality of different wavelengths.

<3.2 Additional Note 2>

The spacecraft is provided with the optical transmission device 20 that transmits an optical communication signal, and the optical transmission device 20 is preferably configured to be able to change the angle of radiation of the optical communication signal. The angle of radiation of the optical communication signal is changed by the controller 70. In order to change the angle of radiation, the optical transmission device 20 may include a plurality of lenses. In the optical transmission device 20, the angle of radiation of the optical communication signal is changed when a lens used for optical transmission is changed. When the angle of radiation is reduced, light intensity at the reception side is increased, thereby enabling communication at a higher speed. Meanwhile, when the angle of radiation is increased, the optical communication signal can be transmitted to a broader area.

<3.3 Additional Note 3>

At least one of the imaging device 50 (the first camera 51A, the second camera 51B, the first camera 52A, and the second camera 52B) and the optical transmission device (the first optical transmitter 21 and the second optical transmitter 22) may be disposed on the satellite 10 such that the orientation thereof is changeable. The changeable orientation facilitates communication with another satellite existing on a different orbital plane. In the present embodiment, since attitude control of the satellite 10 itself is also used for capturing another satellite, even if a mechanism for changing the orientations of the imaging device 50 and the optical transmission device 20 is provided for capturing another satellite, this mechanism can be miniaturized.

If an imaging device and an optical transmission device are disposed on each of two or more communication surfaces 12a, 12b, it is preferable that the orientations of the imaging device and the optical transmission device disposed on at least one communication surface 12a are not changeable while the orientations of the imaging device and the optical transmission device disposed on at least another communication surface 12b are changeable. If the imaging device disposed on the communication surface 12b includes the first camera 52A having a wide view angle and the second camera 52B having a narrow view angle, the orientation of the first camera 52A need not be changeable as long as the orientation of the second camera 52B is changeable.

REFERENCE SIGNS LIST 10 nanosatellite
11a earth-oriented surface
11b opposite surface
12a first surface (communication surface)
12b second surface (communication surface)
12c third surface
12d fourth surface
15 gravity attitude stabilization system
15A boom
15B end
20 optical transmission device
21 first optical transmitter
22 second optical transmitter
30 antenna
50 imaging device
51 first imaging unit
51A first camera
51B second camera
52 second imaging unit
52A first camera
52B second camera
60 image processing processor
70 controller
71 processor
72 memory
73 computer program
73a optical communication processing module
73b wireless communication processing module
73c capturing processing module
73d attitude control processing module
74 area
80 attitude control actuator
100 wireless communication device

The invention claimed is:

1. A spacecraft, comprising:
an attitude control actuator configured to control an attitude of the spacecraft;
an imaging device configured to receive an optical communication signal from another spacecraft; and
an attitude controller configured to control the attitude control actuator, based on a position of the optical communication signal in an image obtained by the imaging device,
wherein the imaging device is configured to be able to perform imaging at a first view angle, and imaging at a second view angle smaller than the first view angle, and
the spacecraft further includes a communication controller that switches the imaging device between a first mode of receiving the optical communication signal through the imaging at the first view angle, and a second mode of receiving the optical communication signal through the imaging at the second view angle.

2. The spacecraft according to claim 1, further comprising a gravity attitude stabilization system configured to stabilize the attitude of the spacecraft in a vertical direction with respect to a celestial body, by using gravity, from the celestial body, which acts on the spacecraft.

3. The spacecraft according to claim 2, wherein
the spacecraft has a first direction, a second direction orthogonal to the first direction, and a third direction orthogonal to the first direction and the second direction,
the first direction is oriented in the vertical direction with respect to the celestial body by the gravity attitude stabilization system, and
the attitude controller is configured to control orientations of the spacecraft in the second direction and the third direction such that the spacecraft takes an attitude that allows the optical communication signal to fall in a field of view of the imaging device.

4. The spacecraft according to claim 1, wherein
the first mode is a mode of receiving the optical communication signal at a first communication speed, and
the second mode is a mode capable of receiving the optical communication signal at a second communication speed higher than the first communication speed.

5. The spacecraft according to claim 1, wherein
the imaging device includes a first camera having the first view angle and a second camera having the second view angle, and
the second camera has a field of view that exists within a field of view of the first camera.

6. The spacecraft according to claim 1, wherein
the imaging device includes a first imaging unit disposed on a first surface of the spacecraft, and a second imaging unit disposed on a second surface, opposite to the first surface, of the spacecraft, and
each of the first imaging unit and the second imaging unit includes a first camera having the first view angle and a second camera having the second view angle.

7. A communication method for communication between ground stations, the method comprising:
transmitting, from a first ground station, data addressed to a second ground station so as to relay the data by inter-spacecraft communication; and
relaying the data by the inter-spacecraft communication, wherein
the inter-spacecraft communication includes
transmitting the data, as an optical communication signal, from a first spacecraft to a second spacecraft,
receiving, by the second spacecraft, the optical communication signal from the first spacecraft, and
controlling an attitude by the second spacecraft,
the second spacecraft includes
an attitude control actuator configured to control an attitude of the second spacecraft,
an imaging device configured to receive the optical communication signal from the first spacecraft, and
an attitude controller configured to control the attitude control actuator, based on a position of the optical communication signal in an image obtained by the imaging device,
wherein the imaging device is configured to be able to perform imaging at a first view angle, and imaging at a second view angle smaller than the first view angle, and
the second spacecraft further includes a communication controller that switches the imaging device between a first mode of receiving the optical communication signal through the imaging at the first view angle, and a second mode of receiving the optical communication signal through the imaging at the second view angle, and
controlling the attitude by the second spacecraft is performed by the attitude controller, based on the position of the optical communication signal in the image obtained by the imaging device.

8. A communication system for communication between ground stations, the system comprising:
a first ground station;
a second ground station configured to receive data transmitted from the first ground station; and
a plurality of spacecraft used for relaying, by inter-spacecraft communication, transmission of the data from the first ground station to the second ground station, wherein
the plurality of spacecraft include a first spacecraft that transmits the data as an optical communication signal, and a second spacecraft that receives the optical communication signal, and
the second spacecraft includes
an attitude control actuator configured to control an attitude of the second spacecraft,
an imaging device configured to receive the optical communication signal from the first spacecraft, and
an attitude controller configured to control the attitude control actuator, based on a position of the optical communication signal in an image obtained by the imaging device,
wherein the imaging device is configured to be able to perform imaging at a first view angle, and imaging at a second view angle smaller than the first view angle, and
the second spacecraft further includes a communication controller that switches the imaging device between a first mode of receiving the optical communication signal through the imaging at the first view angle, and a second mode of receiving the optical communication signal through the imaging at the second view angle.

* * * * *